US010719526B2

(12) United States Patent
Burton et al.

(10) Patent No.: US 10,719,526 B2
(45) Date of Patent: Jul. 21, 2020

(54) SYSTEM AND METHOD FOR SYNCHRONIZING INSTRUMENTATION SPECIFICATIONS BETWEEN A PROCESS CONTROL SYSTEM AND A DATABASE

(71) Applicant: Hargrove Controls + Automation, LLC, Mobile, AL (US)

(72) Inventors: Matthew Robert Burton, Mobile, AL (US); Karen Griffin, Spanish Fort, AL (US)

(73) Assignee: Hargrove Controls + Associates, LLC, Mobile, AL (US)

( * ) Notice: Subject to any disclaimer, the term of this patent is extended or adjusted under 35 U.S.C. 154(b) by 271 days.

(21) Appl. No.: 15/947,692

(22) Filed: Apr. 6, 2018

(65) Prior Publication Data

US 2019/0310991 A1    Oct. 10, 2019

(51) Int. Cl.
*G06F 16/25* (2019.01)
*G06F 16/23* (2019.01)
*G05B 19/408* (2006.01)

(52) U.S. Cl.
CPC ......... *G06F 16/25* (2019.01); *G05B 19/4083* (2013.01); *G06F 16/235* (2019.01); *G05B 2219/32422* (2013.01)

(58) Field of Classification Search
CPC .............................. G06F 16/25; G05B 19/0428
See application file for complete search history.

(56) References Cited

U.S. PATENT DOCUMENTS

| 6,737,966 B1 * | 5/2004 | Calder ............... G05B 19/0428 340/502 |
| 7,191,284 B1 | 3/2007 | Gupta |
| 7,359,927 B1 | 4/2008 | Cardente |
| 2010/0011001 A1 | 1/2010 | Holmes |
| 2010/0179941 A1 | 7/2010 | Agrawal |
| 2016/0210202 A1 | 7/2016 | Sinha |

OTHER PUBLICATIONS

Appl. No. PCT/US19/26139, filed Apr. 5, 2019, International Search Report, dated Jul. 25, 2019.
Appl. No. PCT/US19/26139, filed Apr. 5, 2019, Written Opinion of the International Searching Authority, dated Jul. 25, 2019.

* cited by examiner

*Primary Examiner* — Etienne P Leroux
(74) *Attorney, Agent, or Firm* — AdamsIP, LLC

(57) ABSTRACT

A system and method for synchronizing instrument specification data between a process control system and an external database are provided. A software application automatically connects to the process control system and scans a set of data utilized by the system to detect changes in the data since a previous scan. If changes are detected, the application notifies a manager to accept or reject changes. If changes are accepted, the application updates data stored on an instrumentation database external to the process control system so that the data stored on the instrumentation database is synchronized with real-time data used by the process control system. The system and method provide automated updates to ensure the accuracy of data utilized by users not having regular access to the process control system.

11 Claims, 5 Drawing Sheets

SYSTEM AND METHOD FOR SYNCHRONIZING INSTRUMENTATION SPECIFICATIONS BETWEEN A PROCESS CONTROL SYSTEM AND A DATABASE

FIELD OF THE INVENTION

The present invention relates generally to a system and a method for automated synchronization of instrumentation specifications in a process control system with a database external to the control system.

BACKGROUND

Industrial facilities, which may include manufacturing facilities, refineries, chemical plants, or other similar types of facilities, utilize automated process control systems comprising numerous pieces of process instrumentation and control equipment, which facilitate automated control of various process equipment in the facility such as valves or pumps in order to produce a desired process performance. Examples of process instrumentation may include flow meters, temperature sensors, pressure transmitters, level sensors, and analysis instruments such as pH meters. Instrumentation generally operates at a defined setpoint within a specification range, though depending on the application, setpoints may be changed either outside of a given range or within the range based on optimization of operating conditions. Due to continued maintenance and optimization in a facility, operators controlling the process control system may change data values for setpoints in the process control system frequently.

Because the automated process control system is the facility operators' primary tool for control of the process, the control system itself always maintains the most current instrument specification data, which may include instrument setpoints, ranges, alarm settings, instrument name, description, dimensions, or other types of data relating to a process control instrument. Each instrument in a facility has an instrument specification sheet containing various data relating to the instrument. This data is typically maintained in an offline instrumentation specification database external to the process control system. When specification data is changed during the operation of a facility, which may occur on a large scale when a project is commissioned to upgrade the facility, which may include upgrades to the process control system, the instrumentation specification database is not typically updated in a timely manner to reflect the numerous changes in instrumentation data that occur. Often, the database is incompletely updated or not updated at all during major facility upgrades, or may be updated at a later time as a stand-alone project. Because even relatively small industrial facilities typically have a very large number of process control instruments, maintaining the offline instrumentation database may be a time-intensive and thus costly process. Because engineers and others in a facility generally rely on data contained in the instrumentation database, discrepancies in instrument specification data between the instrumentation database and the process control system can be problematic and require continuous double checking to ensure accurate specifications are being relied upon. These problems lead to inefficiencies in managing and operating a complex facility.

Accordingly, there is a need for an automated system and method for continuously maintaining accurate instrument specification data relating to instruments in a process control system in a database external to the control system.

SUMMARY

In one aspect, a system and a method for synchronizing or updating a instrument specification data relating to process control instruments for controlling a process is provided. The system includes an automated process control system configured to automatically control a process based on instrument specification data input by an operator of the process control system and an update server operatively connected to an instrumentation database that is external to the process control system. An automated update software application is stored on the update server and is programmed to automatically update the instrumentation database so that instrumentation data stored in the instrumentation database matches current instrumentation data used by the process control system to control the process.

The process control system includes a process control database that stores all real-time instrumentation data used to control the process. The instrumentation data stored in the process control database is continually changed by operators of the process control system, as needed, over the life of the facility in order to reflect desired operating conditions at any given time. Instrumentation data may be changed by operators for a variety of reasons such as a response to a process upset, process optimization efforts, or changes or upgrades to the process control system, among other reasons. The software application is programmed to connect to the process control system intermittently and scan the real-time instrument specification data stored in the process control database at predefined time intervals. When scanning the data, the application detects all changes in the instrument specification data that have been implemented since the most recent scan. If any change is detected, the application sends an approval request to a manager having authority to grant the approval request. If the request is granted, the update server stores updated instrument specification data within the instrumentation database. This updated data overwrites existing data so that the data stored on the instrumentation database accurately represents the real-time data utilized by the process control system, though previously stored instrumentation data may be retained to create a record of changes. Thus, facility managers will be notified in a timely manner of all changes to the process control system, and if approved by a manager, all changes will be updated in the offline instrument specification database.

Accordingly, the present system for updating an instrument specification database provides an automated synchronization tool, though approval for all changes is required for management purposes and industry protocols requiring facilities to document all changes in industrial processes for regulatory and safety purposes. The present system is advantageous in that it eliminates the manpower required to manually update an offline instrument specification database, which is the main repository for specification and design documents when upgrading, expanding, building, or modifying an industrial facility such as a chemical plant, refinery, or manufacturing facility. Change approval requests may be sent to a designated supervisor depending on the unit location of the instrument within the facility. Managers or supervisors may be notified by email or by any other suitable method of notification.

The present automated database synchronization system is a universal system that can communicate with any commercially available process control system that utilizes instrument specification data. The present system may be utilized in any type of chemical plant, refinery, paper mill, manufacturing facility, or any other similar type of industrial facility with a process control system using an OPC (open platform communication) gateway for communication. OPC is an industry standard communications protocol available on virtually all automated process control systems that are currently commercially used in industrial facilities.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Systems and methods consistent with the principles of the present disclosure may provide solutions for automated synchronization of process control instrumentation data between a process control system and an external, or offline, database. For example, the systems and methods may be used to automatically update an instrumentation database so that instrument specification data stored in the instrumentation database matches real-time instrument specification data stored in a process control database used for automated process control in an industrial facility such as a chemical plant or refinery.

Figure 1:
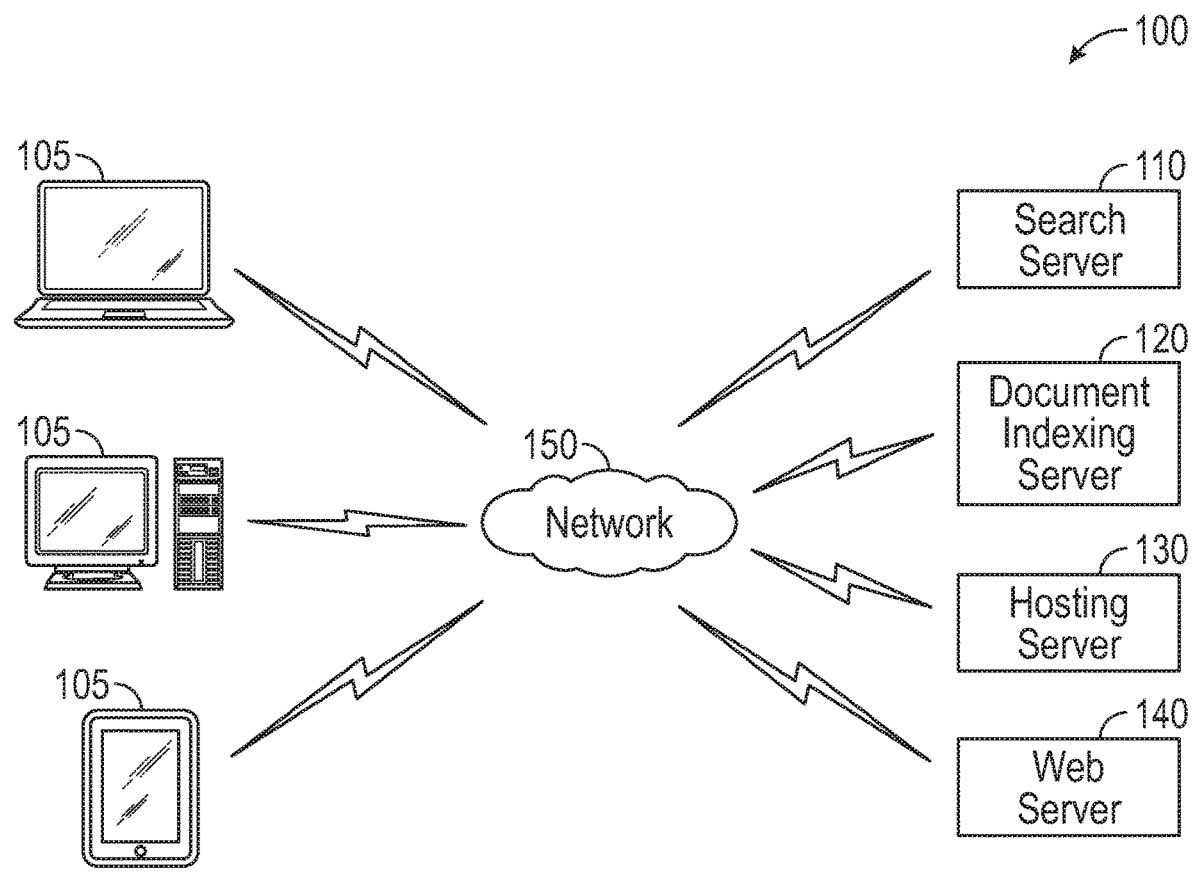
FIG. 1 illustrates a diagram of an example environment in which techniques described herein may be implemented.

FIG. 1 is a diagram of an example environment 100 in which techniques described herein may be implemented. Environment 100 may include multiple clients 105 connected to one or more servers 110-140 via a network 150. In some implementations, and as illustrated, server 110 may be a search server, that may implement a search engine; server 120 may be a document indexing server, e.g., a web crawler; and servers 130 and 140 may be a hosting server and a general web server, respectively, such as servers that provide content to clients 105. Clients 105 and servers 110-140 may be connected to network 150 via wired, wireless, or a combination of wired and wireless connections.

Three clients 105 and four servers 110-140 are illustrated as connected to network 150 for simplicity. In practice, there may be additional or fewer clients and servers. Also, in some instances, a client may perform the functions of a server and a server may perform the functions of a client.

Clients 105 may include devices of users that access servers 110-140. A client 105 may include, for instance, a personal computer, a wireless telephone, a personal digital assistant (PDA), a laptop, a smart phone, a tablet computer, a camera, or another type of computation or communication device. Servers 110-140 may include devices that access, fetch, aggregate, process, search, provide, and/or maintain documents, filed, and/or images. Although shown as single components 110, 120, 130, and 140 in FIG. 1, each server 110-140 may, in some implementations, be implemented as multiple computing devices, which potentially may be geographically distributed.

Search server 110 may include one or more computing devices designed to implement a search engine, such as a documents/records search engine, general webpage search engine, image search engines, etc. Search server 110 may, for example, include one or more web servers to receive search queries and/or inputs from clients 105, search one or more databases in response to the search queries and/or inputs, and provide documents, files, or images, relevant to the search queries and/or inputs, to clients 105. In some implementations, search server 110 may include a web search server that may provide webpages to clients 105, where a provided webpage may include a reference to a hosting server 130 or a web server 140, at which the desired information and/or links is located. The references, to the hosting server 130 or web server 140 at which the desired information is located, may be included in a frame and/or text box, or as a link to the desired information/document.

Document indexing server 120 may include one or more computing devices designed to index files and images available through network 150. Document indexing server 120 may access other servers, such as hosting servers or web servers that host content, to index the content. In some implementations, document indexing server 120 may index files/images stored by other servers, such as hosting server 130 or web server 140, and connected to network 150. Document indexing server 120 may, for example, store and index content, information, and documents relating to three-dimensional images and field of view images and prints.

Hosting server 130 and/or web server 140 may each include servers that provide webpages to clients. The webpages may be, for example, HTML-based webpages. A hosting server 130 and/or web server 140 may host one or more websites. A website, as the term is used herein, may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

While servers 110-140 are shown as separate entities, it may be possible for one or more servers 110-140 to perform one or more of the functions of another one or more of servers 110-140. For example, it may be possible that two or more of servers 110-140 are implemented as a single server. It may also be possible for one of servers 110-140 to be implemented as multiple, possibly distributed, computing devices.

Network 150 may include one or more networks of any kind, including, but not limited to, a local area network (LAN), a wide area network (WAN), a telephone network, such as the Public Switched Telephone Network (PTSN), an intranet, the Internet, a memory device, another type of network, or a combination of networks.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
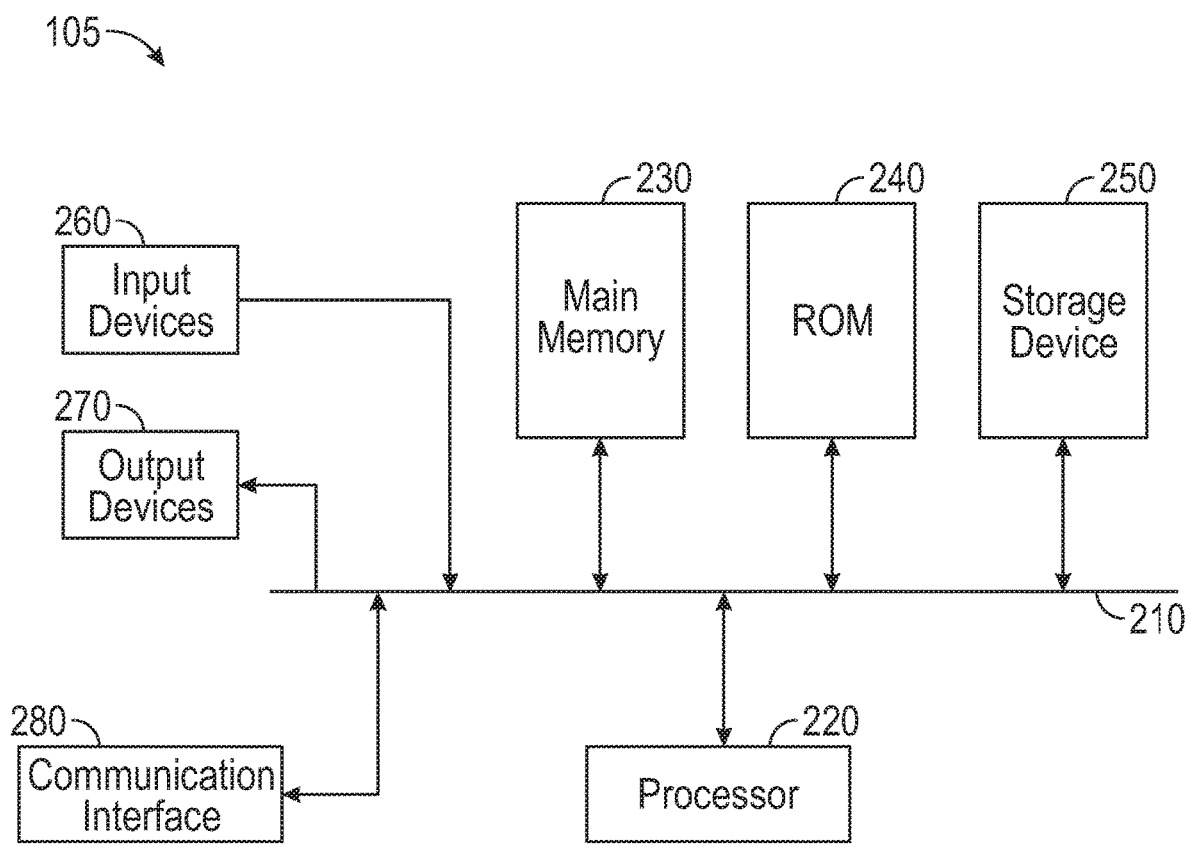
FIG. 2 illustrates an exemplary diagram of a client of FIG. 1 according to an implementation consistent with the principles of the invention.

FIG. 2 is an exemplary diagram of a user/client 105 or server entity (hereinafter called "client/server entity"), which may correspond to one or more of the clients and servers, according to an implementation consistent with the principles of the invention. The client/server entity 105 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity 105.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive. Storage device 250 may also include flash storage and its corresponding hardware.

Input device(s) 260 may include one or more conventional mechanisms that permit an operator to input information to the client/server entity 105, such as a camera, a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity 105 to communicate with other devices 105 and/or systems. For example, communication interface 280 may include mechanisms for communicating with another device 105 or system via a network, such as network 150.

As will be described in detail below, the client/server entity 105, consistent with the principles of the invention, performs certain image recording and printing operations. The client/server entity 105 may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 causes processor 220 to perform processes that will be described in greater detail below. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 3:
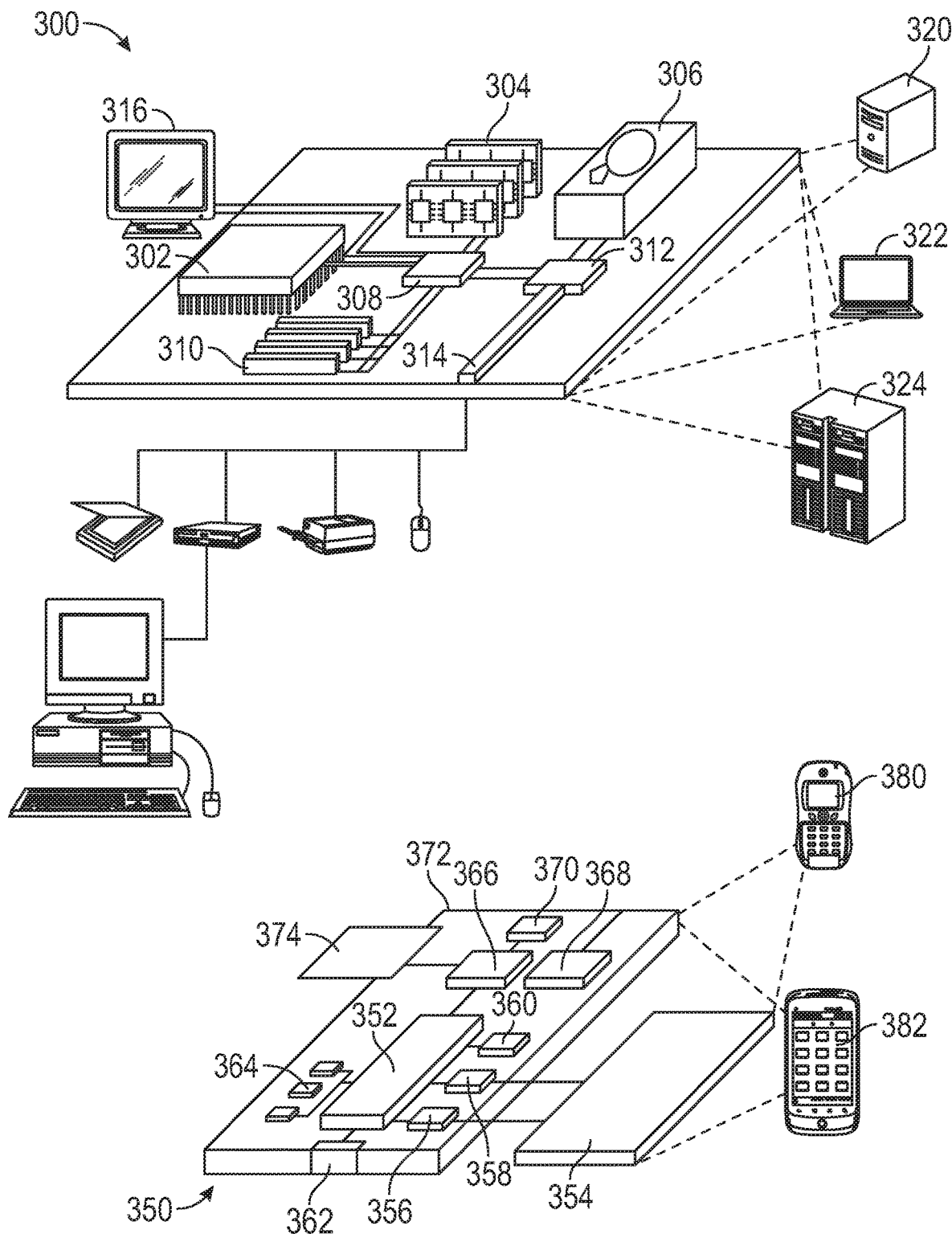
FIG. 3 illustrates a diagram of an example of a computing device and a mobile computing device.

FIG. 3 is a diagram of an example of a computing device 300 and a mobile computing device 350, which may be used with the techniques described herein. Computing device 300 or mobile computing device 350 may correspond to, for example, a client 105 and/or a server 110-140. Computing device 300 is intended to represent various forms of digital computers, such as laptops, desktops, workstations, personal digital assistants, servers, mainframes, and other appropriate computers. Mobile computing device 350 is intended to represent various forms of mobile devices, such as personal digital assistants, cellular telephones, smart phones, tablet computers, and other similar computing devices. The components shown in FIG. 3, their connections and relationships, and their functions, are meant to be examples only, and are not meant to limit implementations described herein.

Computing device 300 may include a processor 302, a memory 304, a storage device 306, a high-speed interface 308 connecting to a memory 304 and high-speed expansion ports 310, and a low-speed interface 312 connecting to a low-speed expansion port 314 and a storage device 306. Each of components 302, 304, 306, 308, 310, 312, and 314 are interconnected using various buses, and may be mounted on a common motherboard or in other manners as appropriate. Processor 302 can process instructions for execution within computing device 300, including instructions stored in memory 304 or on storage device 306 to display graphical information for a graphical user interface (GUI) on an external input/output device, such as display 316 coupled to high-speed interface 308. In other implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within computing device 300. In some implementations, memory 304 includes a volatile memory unit or units. In another implementation, memory 304 may include a non-volatile memory unit or units. Memory 304 may also be another form of computer-readable medium, such as a magnetic or optical disk. A computer-readable medium may refer to a non-transitory memory device. A memory device may refer to storage space within a single storage device or spread across multiple storage devices.

Storage device 306 is capable of providing mass storage for computing device 300. In some implementations, storage device 306 may be or contain a computer-readable medium, such as a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or a memory on processor 302.

High-speed interface 308 manages bandwidth-intensive operations for computing device 300, while low-speed interface 312 manages lower bandwidth-intensive operations. Such allocation of functions is an example only. In some implementations, high-speed interface 308 is coupled to memory 304, display 316, such as through a graphics processor or accelerator, and to high-speed expansion ports 310, which may accept various expansion cards. In this implementation, low-speed interface 312 may be coupled to storage device 306 and low-speed expansion port 314. Low-speed expansion port 314, which may include various communication ports, such as USB, Bluetooth, Ethernet, wireless Ethernet, etc., may be coupled to one or more input/output devices, such as a keyboard, a pointing device, a scanner, or a networking device such as switch or router, e.g., through a network adapter.

Computing device 300 may be implemented in a number of different forms, as shown in the figures. For example, computing device 300 may be implemented as a standard server 320, or in a group of such servers. Computing device 300 may also be implemented as part of a rack server system 324. In addition, computing device 300 may be implemented in a personal computer, such as a laptop computer 322. Alternatively, components from computing device 300 may be combined with other components in a mobile device, such as mobile computing device 350. Each of such devices may contain one or more computing devices 300, 350, and an entire system may be made up of multiple computing devices 300, 350 communicating with each other.

Mobile computing device 350 may include a processor 352, a memory 364, an input/output ("I/O") device, such as a display 354, a communication interface 366, and a transceiver 368, among other components. Mobile computing device 350 may also be provided with a storage device, such as a micro-drive or other device, to provide additional storage. Each of the components 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display or other appropriate display technology. Display interface 356 may include appropriate circuitry for driving display 354 to present graphical and other information to a user. Control interface 358 may receive commands from a user and convert the commands for submission to processor 352. In addition, an external interface 362 may be provided in communication with processor 352, so as to enable near area communication of mobile computing device 350 with other devices. External interface 362 may provide, for example, for wired communications in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described herein, and may include secure information also. Thus, for example, expansion memory 374 may be provided as a security module for mobile computing device 350, and may be programmed with instructions that permit secure use of mobile computing device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described herein. The information carrier is a computer-or machine readable-medium, such as memory 364, expansion memory 374, or a memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS or MMS messaging, CDMA, TDMA, PDC, WCDMA, CDMA2000, or GPRS, among others. Such communication may occur, for example, through transceiver 368. In addition, short-range communication may occur, such as using a Bluetooth, WiFi, or other such transceiver. In addition, GPS (Global Positioning System) received module 370 may provide additional navigation-related and location-related wireless data to mobile computing device 350, which may be used as appropriate by applications running on mobile computing device 350.

Mobile computing device 350 may be implemented in a number of different forms, as shown in the figures. For example, mobile computing device 350 may be implemented as a cellular telephone 380. Mobile computing device 350 may also be implemented as part of a smart phone 382, personal digital assistant, or other similar mobile device.

Various implementations described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications, or code, include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, such as magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

The contents of computer-readable medium may physically reside in one or more memory devices accessible by a server. Computer-readable medium may include a database of entries corresponding to field of view photographs and files. Each of the entries may include, but are not limited to, a plurality of images collectively making up a user's field of capture when taking the plurality of images, metadata relating to those images, GPS information and other like data.

To provide for interaction with a user, the techniques described herein can be implemented on a computer having a display device, such as a CRT (cathode ray tube), LCD (liquid crystal display), or LED (Light Emitting Diode) monitor, for displaying information to the user and a keyboard and a pointing device by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The techniques described herein can be implemented in a computing system that includes a back end component, such as a data server, or that includes a middleware component, such as an application server, or that includes a front end component, such as a client computer having a graphical user interface or Web browser through which a user can interact with an implementation of the techniques described herein, or any combination of such back end, middleware, or front end components. The components of the system can be interconnected by any form of medium of digital communication.

Figure 4:
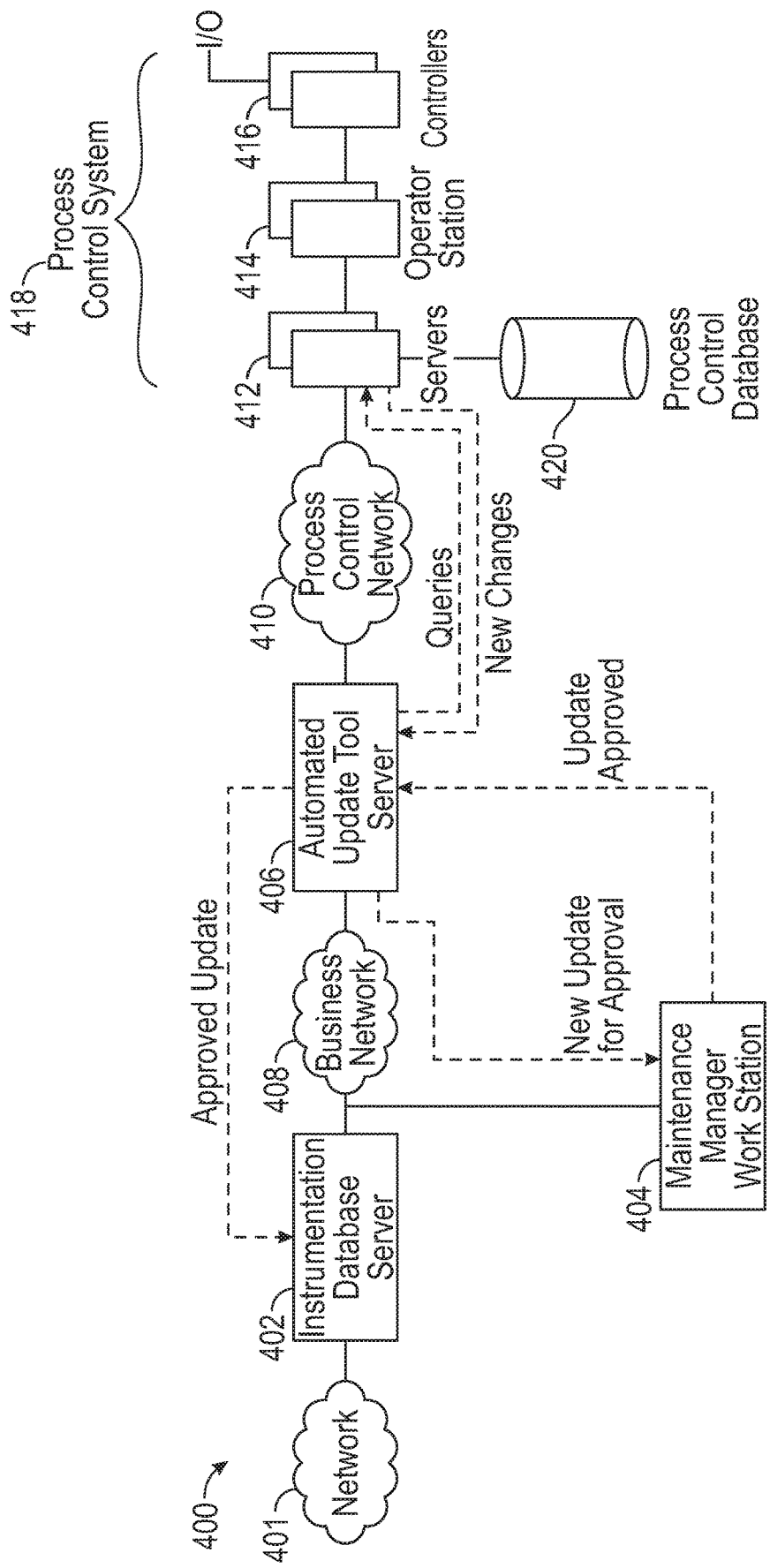
FIG. 4 is a diagram illustrating an example system configuration according to an implementation consistent with the principles of the invention.

As shown in FIG. 4, in one aspect, a system 400 for synchronizing or updating an instrumentation database is provided. The system 400 comprises an automated process control system 418 and an update server 406 operatively connected to an offline instrumentation database 402 to be updated based on real-time process control instrument specification data. As used herein, an "offline instrumentation database" indicates that the instrumentation database 402 is offline relative to a process control network 410 linking various components of the automated process control system 418, though the instrumentation database 402 may be connected to another network, such as a business network 408 or another type of network 401 such as the internet. In other words, the instrumentation database 402 is external to the process control network 410 that allows the components of the control system 418 to communicate. The offline database may have intermittent access to the process control network 410 via a firewall or other network security system that controls access. As used herein, a "business network" refers to an intranet or similar private network.

The process control system 418 comprises process control servers 412, a process control database 420, operator stations 414, and various controllers 416 for controlling process control elements. The operator stations 414 are typically located inside a control room that functions as a control center or hub for automated control of an industrial process. Thus, real-time operating conditions, including instrument specification data, are typically only available in a centralized location within a facility. The process control system 418 is configured to automatically control a process based on instrument specification data input by an operator of the process control system 418. Process operators may input specification data via an operator interface on an operator station 414 connected to the process control network 410. Instrument specification data may include, but is not limited to, alarm settings or setpoints for a process, such as a target flow rate, temperature, pressure, or other target measurement of a process variable or physical property of a process stream. When such data is input via an operator station 414, controllers 416 may actuate various types of process equipment such as control valves or pumps for controlling the process based on the specification data.

The update server 406 intermittently accesses instrument specification data utilized by the process control system 418 via the process control network 410. A non-transitory computer readable medium is coupled to the update server 406 having programming instructions stored thereon, which, when executed by the update server 406, cause the update server 406 to perform certain operations. The programming instructions may be carried out by an automated update software application configured to automatically update the offline instrumentation database 402 pending authorized approval of data changes so that instrumentation data stored in the instrumentation database 402 matches real-time instrumentation data utilized by the process control system 418, which may be stored within a process control database 420 operatively connected to the process servers 412.

When the programming instructions are executed, the update server 406 scans the instrument specification data stored on the process control database 420, which is operably coupled to the process control system 418 and stores real-time specification data for controlling the process, at predefined time intervals to detect changes in the instrument specification data relative to a previous scan of the data. If any changes are detected, the update server 406 then sends an approval request to a manager work station 404 that is accessible to a manager based on a permission level. The manager work station 404 may be any suitable computing device capable of receiving notifications of an approval request and providing user authentication. The work station 404 may be a personal computer, a laptop, a tablet, a smartphone, or a specially designed computing device. Specific managers or supervisors may have different permission levels and work station 404 is configured to authenticate each manager before granting approval to a change request. For instance, some managers may have authority to approve changes in data relating only to certain specified instruments based on the location of the instrument in the facility and/or the manager's particular area of responsibility. Other managers or high-level supervisors may have the authority to approve changes relating to any instrumentation within a facility.

Before the update server 406 scans the instrument specification data to synchronize the instrumentation database 402 with real-time data, the server 406 must first connect to the process control database 420 in which the data is stored. A firewall may establish a barrier between the process control network 410, which provides access to the process control database 420, and both the update server 406 and the instrumentation database 402. Firewall security rules may be established to allow the update server 406 to access the process control network 410 only for the purpose of scanning instrument specification data and only at predetermined time intervals. For instance, the update server 406 may access the process control network 410 to scan the process control database 420 once per day at a specified time each day. The instrumentation database 402 may then be updated with all changes that have been approved by authenticated managers in the preceding 24-hour period of time since the previous day's scan. Instrumentation data stored on the instrumentation database 402 may be time-stamped to notify users accessing the data that the currently available data is "real-time" data as of a specified time, preferably within the preceding 24 hours. In alternative embodiments, other suitable means of providing intermittent access to the process control network 410 for the purpose of scanning instrument specification data may be utilized.

Once a scan of the instrument specification data has detected changes in the data, the update server sends one or more approval requests to one or more relevant managers having the required permission level to approve the request. As each approval request is granted by an authorized manager or supervisor, the update server 406 may store updated instrument specification data within the instrumentation database 402 so that the data available to users outside of the process control system 418 accurately matches the real-time data utilized by the process control system 418 as of the time of the scan that detects the changes. Thus, the process control database 420 and the instrumentation database 402 are synched once all relevant managers grant one or more approval requests sent to each manager.

All users in the facility having access to the instrumentation database 402, such as engineers, process safety managers, and others, will then be able to view up-to-date instrument specification data without the necessity of accessing the data through the process control network 410, which typically involves utilizing an operator station 414 located in a control room in the facility that may not be convenient at all times. Thus, updated instrument specification data is available at any time from any device having access to the instrumentation database 402 via the business network 408 or another network 401, such as the internet.

In another aspect, a method 500 for synchronizing or updating instrument specification data between a process control system and an external database is provided. First, instrument specification data is generated by an operator via a process control system 418. This step may include initial input of data when installing brand new equipment or replacing or updating existing equipment, or more typically involves operators continually updating instrument specification data in real-time in order to optimize the process or correct process upsets. For instance, operators may input specific setpoint values for a target flow rate, temperature, pressure, or other target measurement for a process stream to control the process within desired parameters. As instrument specification data is changed, real-time data is stored within a process control database 420 operably connected to process servers 412, which allow operators of the process control system 418 to control the process via an operator station 414 interface. The update server 406 then connects to the process control database 420 and scans the instrument specification data stored therein at predefined time intervals to detect changes in the data relative to a previous scan of the data.

A manager having responsibility for granting or rejecting approval requests for changes in instrument specification data creates a manager account requiring a specified permission level to access the account so that the manger may receive approval requests through the account. After scanning the data, the update server 406 then sends an approval request to the manager account if the scan detects at least one change in the instrument specification data. The manager may then review all changes and grant or reject an approval request relating to each individual change. Upon granting the approval request, the update server 406 then stores updated instrument specification data within the instrumentation database 402.

Figure 5:
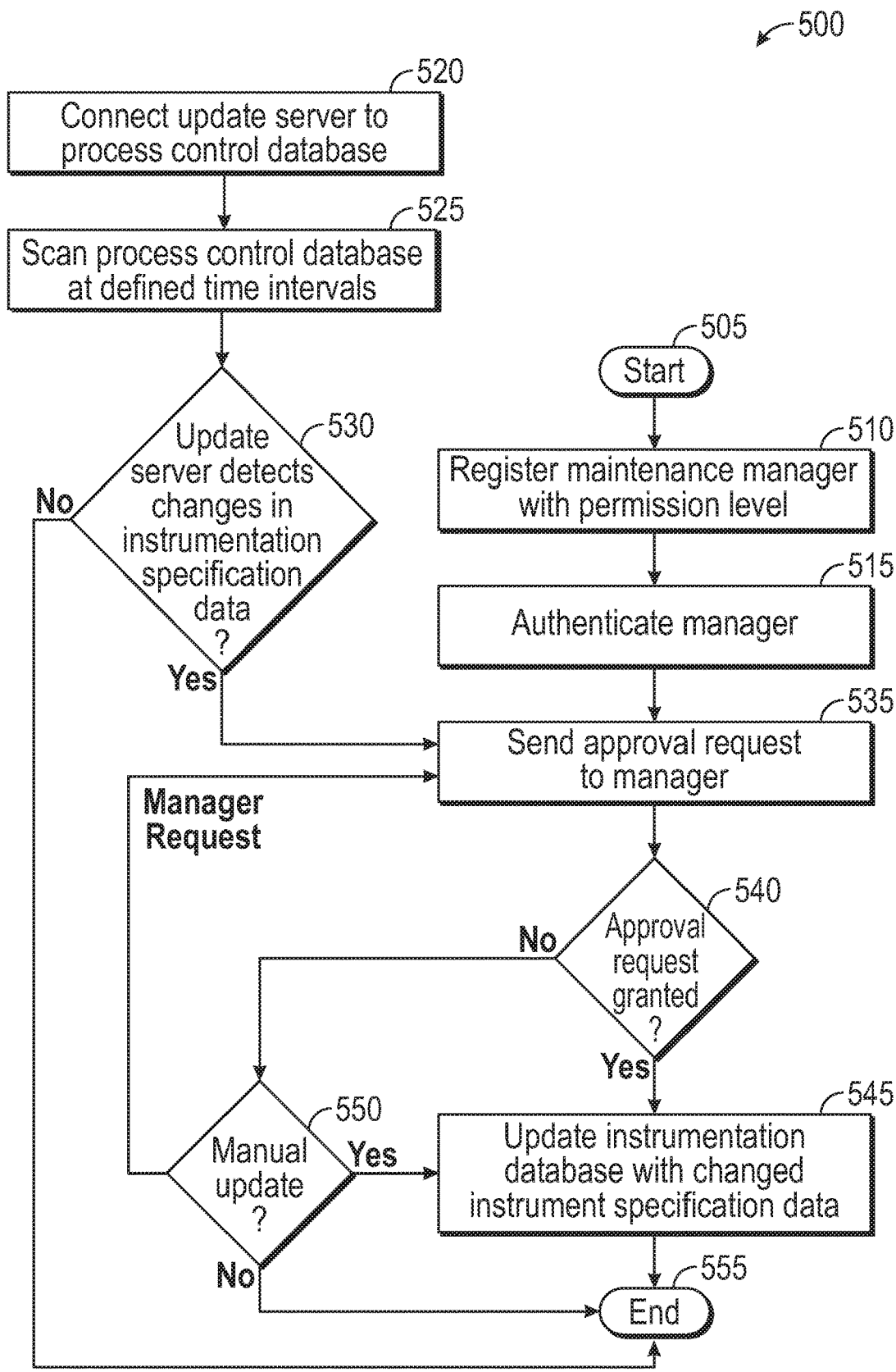
FIG. 5 illustrates a process flow chart of a method that may be used according to an implementation consistent with the principles of the invention.

FIG. 5 provides a flow chart of an illustrative method for updating the instrumentation database 402. Step 505 starts the present method 500. In the first step 510, at least one maintenance manager registers to create a user profile. In a preferred embodiment, a plurality of maintenance managers at a facility registers to form a profile for each individual manager with a defined permission level attached to each profile. Each manager may have different permission levels that allows each individual manager to grant change approval requests relating to a specific set of instruments, which may be located in specific areas of the facility, or to grant approvals facility-wide. Each manager may utilize a graphical user interface on a manager work station 404 or any suitable computing device having access to the automated software application via a business network 408 to create a profile.

To prevent users having access to the business network 408 but who are not authorized to grant approval requests or do not have the required permission level to grant specific approval requests relating to specific instruments, a user's access to the software application may be limited based on permission level. Permission levels of individual users are set by administrators based on the user's job responsibilities and internal business protocols. If a user's permission level is sufficient, the user is allowed to grant or reject an approval request. If a user's permission level is insufficient, the user will be denied access to viewing particular approval requests. Some users may have a permission level that only allows the user to grant or reject an approval request, while other users may be able to take additional actions such as manually changing data. A user's permission level may be based on user roles, which allow users registered within the system to access approval requests for particular sets of instruments. For instance, facility managers may have access to approval requests for all instruments in the facility, and engineers may have access to approval requests for a specific set of instruments located within an area of the facility for which the engineer is responsible.

Once a manager registers with a permission level, in step 515, authentication may be required via the graphical user interface each time a manager accesses the software application to review any requests to approve changes. Authentication may be implemented by passcode, password, or any other suitable means of authentication such as biometric authentication.

In step 520, the update server 406 connects to the process control database 420 via the process control network 410. A barrier, such as through a firewall, is established between the update server 406 and the process control network 410. Established security rules preferably grant the update server 406 access to the process control network 410 only at specified times and only for the purpose of scanning instrumentation specification data. Access is preferably granted once per day, at which time the data is scanned for changes. Access is allowed for a period of time necessary to complete a scan of all instrumentation data. When the scan is complete, the update server 406 is disconnected from the process control network 410 and thus loses access to real-time operating data of the process control system 418. Thus, instrument specification data is scanned at recurring scheduled predefined time intervals.

In step 525, once the update server 406 is connected to the process control database 420, the update server 406 scans up-to-date instrument specification data stored in the process control database 420 at the scheduled time. In step 530, the update server 406 detects changes in instrument specification data based on the scan. In most cases, the scan will result in at least some changes in the data due to process operators continually updating the data during normal operation of the process control system 418 to control the process. However, if no changes are detected, the method may end in step 555 until the next scheduled scan, which restarts the method 500.

In step 535, when changes in the data are detected, the update server 406 sends an approval request to a manager having a sufficient permission level to grant or reject the approval request. The server may send a notification to the manager notifying the manager of a pending approval request, which the manager may grant or reject in step 540. The notification may be through an email having a link to a webpage or other application interface that allows the manager to grant or reject an approval request. The application may display a list of potential changes that have all occurred since the most recent scan. The manager may scroll through the list and view each change in the list. The manger may individually grant or reject any or all of the listed changes in specification data. Each item of change in the list may be linked to a separate webpage displaying additional information about the particular instrument in question if the manager needs any additional information about the instrument to make an informed decision as to grant or reject the request to change the data.

If the manger grants the approval request, in step 540 the update server 406 initiates the updating of the relevant instrument specification data stored within the instrumentation database 402 so that the instrument specification data stored within the instrumentation database 402 matches the real-time instrument specification data stored within the process control database 420 as of the time of the scan. The instrumentation database 402 is updated with all changes that have been approved by authenticated managers in the preceding 24-hour period of time since the previous day's scan. When updating, the updated instrumentation data may be time-stamped to notify users of the date and time of the scan producing the update.

The method then ends in step 555 upon completion of updating the instrumentation database 402. If the manager rejects the change in step 540, the application may provide the manager with an option to manually input a change in step 550 that is different from the change detected and presented to the manager in step 535. If the manager declines this option, the method ends in step 555. If the manager accepts this option, then the instrumentation database 402 is updated in step 545. In some cases, a manager may override the detected change if, for instance, the manager is familiar with the process control system and knows that the currently detected change is a temporary change and the specification will later be changed to a different value that is known to the manager. Alternatively, the manager may delay acceptance or rejection of the change and request a reminder of the change approval request at a later time. In this case, the manager will receive the notification at a later time in step 535, which will typically be the next time that a scan is performed on the instrument specification data. The time intervals for scans may be daily, weekly, or monthly depending on preferences.

During the life of a process control system, the instrumentation specification data stored in the process control database is continually changed by operators of the process control system as part of normal operations for a variety of reasons. The automated software application is programmed to keep this data up to date in the offline instrumentation database 402. As data is updated, the newly saved and stored data may overwrite existing data as the currently accurate instrumentation data, though previously stored instrumentation data may be retained to create a record of changes. Thus, facility managers and supervisors will be notified in a timely manner of all changes to the process control system, and if approved by a manager, all changes will be updated in the offline instrument specification database 402 used by facility personnel outside of the process control system 418.

The present system for updating a database functions as an automated synchronization tool, though approval for all changes is required for management purposes and industry protocols requiring facilities to document all changes in industrial processes for regulatory and safety purposes. The present system is advantageous in that it eliminates the manpower required to manually update an offline instrument specification database 402, which is the main repository for specification and design documents when upgrading, expanding, building, or modifying an industrial facility such as a chemical plant, refinery, or manufacturing facility.

The present automated database synchronization system is a universal system that can communicate with any process control system 418 that utilizes instrument specification data. The present system may be utilized in any type of chemical plant, refinery, paper mill, manufacturing facility, or any other similar type of industrial facility with a process control system using an OPC (open platform communication) gateway for communication. OPC is an industry standard communications protocol available on virtually all automated process control systems that are currently commercially used in industrial facilities. In one example, the system may be used with the DeltaV digital automations system used in many industrial facilities. Systems such as DeltaV may utilize an application programming interface (API) to extract instrumentation data from the system and manually transfer the data to a new database. The present system utilizes an OPC protocol which may communicate automatically with the API of a process control system such as DeltaV and automatically update the instrumentation database 402 in accordance with the method described herein.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without references to the specific software code—it being understood that one of ordinary skill in the art would be able to design software and control hardware to implement the aspects based on the description herein.

What is claimed is:

1. A system for automatically synchronizing instrument specification data between a process control system and an external database, said system comprising:
 a process control system configured to automatically control a process based on instrument specification data input by an operator of the process control system, wherein the instrument specification data is stored within a process control database within the process control system;
 an update server operably connected to an instrumentation database external to the process control system; and
 a non-transitory computer-readable medium coupled to the update server having programming instructions stored thereon, which, when executed by the update server, cause the update server to perform operations comprising:
  connecting to the process control database via a process control network,
  scanning the instrument specification data at predefined time intervals,
  detecting changes in the instrument specification data relative to a previous scan,
  sending an approval request to a manager work station when the update server detects a change in the instrument specification data, wherein the manager work station is accessible to a manager based on a permission level, and
  storing updated instrument specification data within the instrumentation database when the approval request is granted by the manager.

2. The system of claim 1, wherein access to the process control database by the update server is limited by a firewall.

3. The system of claim 2, wherein access is based on security rules that allow the update server to connect to the process control database only to scan the instrumentation specification data and only for a period of time sufficient to complete a scan.

4. The system of claim 1, wherein the update server performs operations further comprising time stamping the updated instrument specification data stored within the instrumentation database.

5. A method for automatically synchronizing instrument specification data between a process control system and an external database, said method comprising the steps of:
 a. generating instrument specification data, by an operator, via a process control system;
 b. storing the instrument specification data within a process control database within the process control system;
 c. creating a manager account requiring a permission level to access the account;
 d. connecting, by an update server, to the process control database via a process control network;
 e. scanning, by the update server, the instrument specification data at predefined time intervals;
 f. detecting changes in the instrument specification data relative to a previous scan;
 g. sending, by the update server, an approval request to the manager account when the update server detects a change in the instrument specification data;
 h. granting or rejecting, by a manager accessing the manager account, the approval request; and
 i. storing updated instrument specification data within an instrumentation database that is external to the process control system when the approval request is granted by the manager.

6. The method of claim 5, further comprising the step of sending a second approval request to the manager account at a later scheduled time when the approval request is rejected, wherein the second approval request relates to a rejected change in instrument specification data.

7. The method of claim 5, wherein the step of creating a manager account comprises creating a plurality of manager accounts having different permission levels relating to different sets of specified process instruments distributed within an automated process.

8. The method of claim 5, wherein the step of connecting, by an update server, to the process control database via a process control network comprises intermittently connecting to the process control database at scheduled times based on security rules that allow the update server to connect to the process control database only to scan the instrumentation specification data and only for a period of time sufficient to complete a scan.

9. The method of claim 5, further comprising the step of time stamping the updated instrument specification data stored within the instrumentation database.

10. The method of claim 5, further comprising the steps of repeating the method at a plurality of scheduled times and recording previously stored instrumentation data to create an historical record of data changes.

11. The method of claim 5, further comprising the step of manually changing the instrument specification data stored within the instrumentation database, by the manager, when the approval request is rejected by the manager.

* * * * *